United States Patent [19]
Yahagi

[11] Patent Number: 5,966,932
[45] Date of Patent: Oct. 19, 1999

[54] JOINT STRUCTURE FOR EXHAUST PIPES OF INTERNAL COMBUSTION ENGINE

[75] Inventor: Hideo Yahagi, Gotenba, Japan

[73] Assignee: Toyota Jidosha Kabushiki Kaisha, Toyota, Japan

[21] Appl. No.: 08/862,012

[22] Filed: May 22, 1997

[30] Foreign Application Priority Data

May 31, 1996 [JP] Japan .................................. 8-139263

[51] Int. Cl.⁶ ...................................................... F01N 3/00
[52] U.S. Cl. ............................................ 60/322; 285/124.1
[58] Field of Search .......................... 60/322; 285/124.1, 285/124.2, 124.3, 124.4, 49, 39

[56] References Cited

U.S. PATENT DOCUMENTS

| | | | |
|---|---|---|---|
| 4,223,922 | 9/1980 | Pape | 285/39 |
| 4,659,117 | 4/1987 | Holzhausen et al. | 285/49 |
| 4,875,716 | 10/1989 | Winzen et al. | 285/124.4 |
| 4,928,998 | 5/1990 | Brandener | 285/49 |
| 5,318,329 | 6/1994 | Suzuki et al. | 285/49 |
| 5,393,108 | 2/1995 | Kerr | 285/368 |

FOREIGN PATENT DOCUMENTS

| | | |
|---|---|---|
| 61-84122 | 6/1986 | Japan . |
| 263025 | 5/1990 | Japan . |
| 6108832 | 4/1994 | Japan . |

Primary Examiner—Thomas E. Denion
Attorney, Agent, or Firm—Kenyon & Kenyon

[57] ABSTRACT

To provide an exhaust pipe joint structure which positively absorb vibrations from an internal combustion engine without any leakage or the like and in addition may prevent an enlargement of a system, the joint is connected to the internal combustion engine. When a plurality of first exhaust pipes 2a and 2b juxtaposed to each other is to be connected through a joint 3 to a plurality of second exhaust pipes 4a and 4b juxtaposed to each other, joints 3 having spherical flanges are provided for two or more joint pairs so that a line (V) connecting spherical surface centers of the respective spherical flanges of the respective joint pairs is substantially in parallel with a roll axis (A) of the internal combustion engine. Thus, the shift around the roll axis may be absorbed by a bend of the joint.

4 Claims, 5 Drawing Sheets

PRIOR ART

JOINT STRUCTURE FOR EXHAUST PIPES OF INTERNAL COMBUSTION ENGINE

BACKGROUND OF THE INVENTION

1. Field of the Invention

The present invention relates to an exhaust system connected to an internal combustion engine, and more particularly to a joint structure for connecting a plurality of exhaust pipes with each other.

2. Description of the Related Art

In general, an internal combustion engine is mounted swingably in order to avoid the transmission of much vibrations in operation to a chassis. A size and magnitude of vibrations of the internal combustion engine is determined by a mount position of the internal combustion engine in the chassis, a spring constant of the mount, and a torque reactive force to be applied to the internal combustion engine. Then, in general, a swing center axis of the internal combustion engine for a torque reactive force of the internal combustion engine is referred to as a roll axis.

In the case where an exhaust gas system is mounted in a vehicle such as an FF vehicle in which an internal combustion engine is mounted on a front portion of the chassis and the front wheels are driven and the torque reactive force is large so that the vibrations of the internal combustion engine are remarkable, the exhaust pipes are largely vibrated in accordance with the vibrations of the internal combustion engine when the vehicle is started and accelerated. For this reason, a joint is provided for moderating the force to be applied to the exhaust pipes due to the vibrations of the internal combustion engine and for interrupting the transmission of the vibrations.

By the way, in order to prevent the degradation of the exhaust gas efficiency of the internal combustion engine due to the exhaust gas interference, a so-called dual exhaust system is utilized. In such an exhaust system, two independent exhaust pipes are connected successively after the dual exhaust manifold connected to exhaust ports of the internal combustion engine.

Also, the above-described joint for interrupting the vibrations is provided in such a dual exhaust system.

Figure 10:
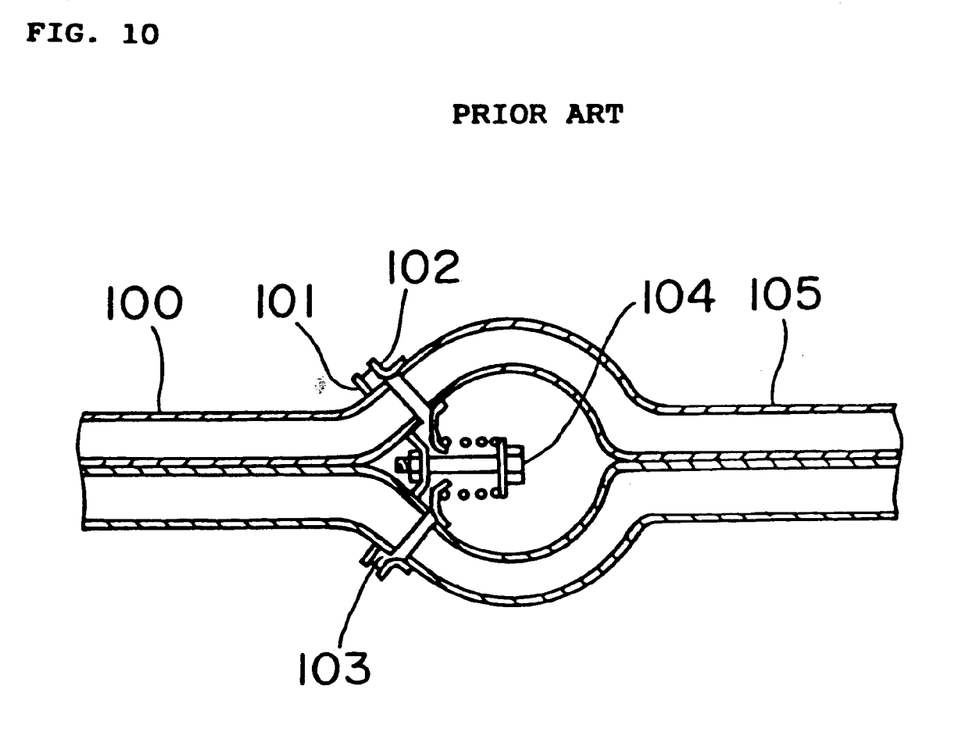
FIG. 10 is a showing of a prior art joint structure. engine and a rotary axis of the joint for the structure shown in FIG. 8.

For example, in Japanese Utility Model Application No. Hei 2-63025, as shown in FIG. 10, there have been proposed a joint for an exhaust pipe characterized in that a flange 101 having bolt holes for integrating the exhaust pipes in alignment with each other is formed at end portions of a plurality of exhaust pipes 100 connected to a body of an engine, a mounting flange 102 having bolt holes and connected to the above-described flange 101 is mounted on an exhaust pipe 105 on a tail side for connecting with the above described exhaust pipes 100, and the mount flange 102 and the flange 101 are fixed to each other through a seal portion 103 to connect the exhaust pipes with each other. The publication discloses an embodiment in which the flange 101 is made in a spherical shape. Then, the publication discloses that if the flange 101 on the engine side and the mounting flange 102 are firmly fixed to each other by the bolts, the exhaust pipes on the engine side and the exhaust pipes on the tail side may be positively connected with each other in a slidable manner. Accordingly, even if the vibrations are transmitted from the engine to the exhaust pipes, the exhaust pipes located upstream and downstream of the joint are slidingly moved relative to each other along the seal surface of the seal member. The width of the movement is just allowed within a thickness of the seal portion 103 and a gap of the bolt holes.

By the way, when the internal combustion engine is fluctuated, the vibrations due to its fluctuation are transmitted to the exhaust pipes, so that the load caused by the vibrations is applied to the joint portion.

Also, in many cases, the arrangement of the joint is remote from the internal combustion engine. In the case where the internal combustion engine is fluctuated, there is a possibility that the two exhaust pipes in the dual exhaust system would be different from each other in directional shift amount, so that a strain might be generated between the two exhaust pipes.

Accordingly, in the case where the slidable direction of the joint is different from the load application direction or the direction of the strain, there is a fear that the joint per se would be damaged, or the joint portion would be lifted to open to allow the leakage of the exhaust gas.

Accordingly, it is desirable that, as in a single ball joint, a joint that is movable in all directions about one center for coping with universal-directional loads.

It is possible to provide such a joint that is movable about one center point by making the flanges spherical ones and causing the respective spherical shapes to have a common center point in the system disclosed in the above-described Japanese Utility Model Application No. Hei 2-63025. However, as a result, it is necessary to curve the exhaust pipes considerably to the outside at the flange portion. Thus, this approach involves a problem that the structure of the joint portion is enlarged in size. Also, in Japanese Utility Model Application No. Sho 61-84122 that corresponds to U.S. patent application Ser. No. 735,462, since the dual exhaust pipes are connected with each other with one ball joint so as to incorporate therein the two exhaust pipes, it is inevitable to enlarge the joint structure in the same way as in the foregoing approach.

SUMMARY OF THE INVENTION

An object of the present invention is to provide an exhaust pipe joint structure which positively absorb vibrations from an internal combustion engine without any leakage or the like and in addition may prevent an enlargement of a system.

In order to attain this and other objects, the present invention is characterized by the following features.

According to a first aspect of the invention, there is provided a joint structure for exhaust pipes, A joint structure for exhaust pipes, comprising;

a plurality of first exhaust pipes juxtaposed and connected to an internal combustion engine that may fluctuate about a roll axis, a plurality of second exhaust pipes juxtaposed to each other, and a joint connecting the first exhaust pipes and the second exhaust pipes, wherein, the respective first exhaust pipes form joint pairs connected with the respective second exhaust pipes, the joint is provided to the respective joint pairs of the exhaust first and second pipes respectively, a spherical flange facing the first or second exhaust pipes of the joint pairs is provided on the joint of the two or more joint pairs; and a line connecting spherical surface centers of the respective spherical flanges of the joints is substantially in parallel with the roll axis of the internal combustion engine.

The line connecting the spherical surface centers of the respective spherical flanges of the joints with each other is substantially in parallel with the roll axis of the internal combustion engine. Accordingly, when the internal combustion engine is fluctuated by the torque reactive force, the joint portion operates as if it is a hinge corresponding to the fluctuation direction. Accordingly, the vibratory shift is inputted to the respective joints of the respective joint pairs in the direction along the spherical surfaces of the spherical flanges about the rotary centers of the line connecting the spherical centers of the respective spherical flanges with each other. As a result, the first exhaust pipes and the second exhaust pipes are rotated relative to each other along the sliding surface of the spherical surfaces.

According to this feature, the vibratory shift is inputted in the direction along the spherical surfaces of the spherical flanges about the rotary centers of the line connecting the spherical centers of the respective spherical flanges with each other, and the first exhaust pipes and the second exhaust pipes may be rotated relative to each other along the sliding surface of the spherical surfaces. The load to be applied to the joint portion by the vibrations of the internal combustion engine about the roll axis may be absorbed by the relative rotation between the first and second exhaust pipes. Accordingly, there is no fear of the damage of the joint portion. The leakage of the exhaust gas or the like due to the lift will not be generated.

Also, since a structure is taken in which the plurality of first exhaust pipes juxtaposed to each other are connected through the joint to the plurality of second exhaust pipes juxtaposed to each other, it is possible to avoid the enlargement in size of the joint structure in comparison with the prior art examples.

In addition, in the foregoing structure, it is possible to take such an arrangement that the spherical flanges are provided on the adjacent joint pairs; the spherical flange of one joint pair is stepped in an axial direction of the exhaust pipes relative to the spherical flange of the other adjacent joint pair; and the flange of one joint pair and the flange of the other joint pair are partially overlapped with each other.

With such an arrangement, since one spherical flange may be partially overlapped with the other spherical flange, it is possible to reduce an arrangement space for the spherical flanges and to reduce the size of the joint portion due to the reduction in arrangement space.

Also, in the foregoing structure, a flexible tubular member may be disposed at a position downstream of the joint in the exhaust gas flow. It is thus possible to absorb vibratory shifts except for that around the roll axis. Accordingly, even if the vibration of the internal combustion engine around the roll axis are dispersed in other directions at the joint portion to some extent, or even if the vibratory shifts except for those around the roll axis are generated due to some other factors, it is possible to absorb such shifts with the flexible tubular member.

According to a second aspect of the invention, there is provided a joint structure for exhaust pipes, comprising;

a plurality of first exhaust pipes juxtaposed and connected to an internal combustion engine, a plurality of second exhaust pipes juxtaposed to each other, and a joint connecting the first exhaust pipes and the second exhaust pipes, wherein, the respective first exhaust pipes form joint pairs connected with the respective second exhaust pipes, the joint is provided to the respective joint pairs of the exhaust first and second pipes respectively, one of the joints provided to one of the joint pairs has a spherical flange facing the first or second exhaust pipe of one of the joint pairs;

the other joints of the other joint pairs has a flexible tubular member (flexible joint).

With such an arrangement, the number of the joints having the spherical flanges is one, and the other flexible joint may move in any direction, i.e., in a universal direction. It is therefore possible for the joint having the spherical flange to move in any direction, i.e., in a universal direction. As a result, with such an arrangement, the exhaust pipe may move in any direction about the joint having the spherical flange. It is therefore possible to mount the exhaust system to the chassis without considering the roll axis direction of the internal combustion engine. Also, although the flexible joint is weak against the tensile load to the exhaust pipe, since the spherical flange may be subjected to the tensile load, it is unnecessary to enhance a mechanical strength of the flexible joint.

BRIEF DESCRIPTION OF THE DRAWINGS

In the accompanying drawings:

FIG. 9 is a view showing a relationship between a roll axis of the

DESCRIPTION OF THE PREFERRED EMBODIMENTS

Embodiments of the inventions will now be described in more detail with reference to the accompanying drawings.

Figure 5:
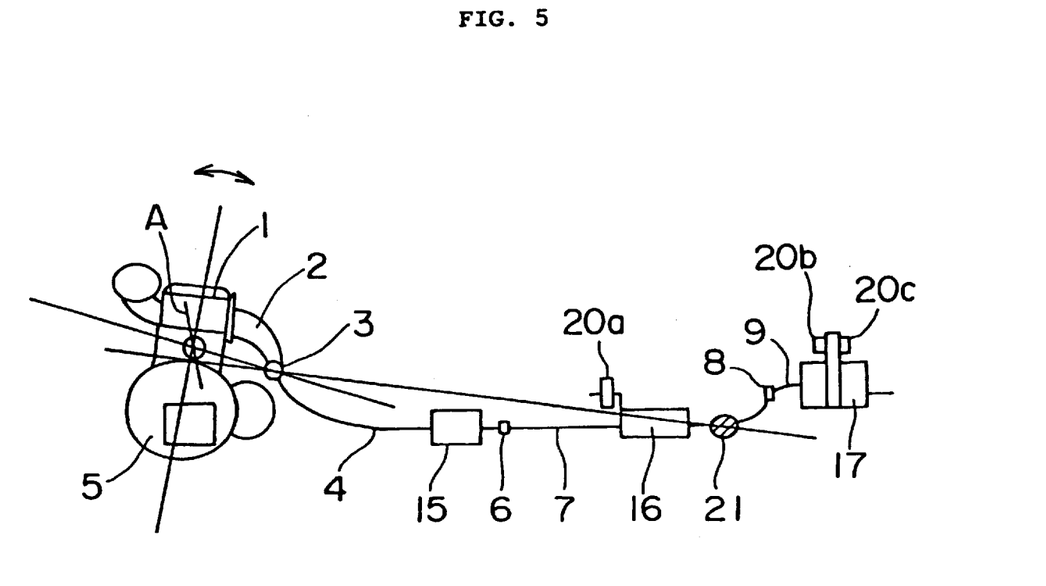
FIG. 5 is a view showing a concept of the exhaust system according to the present invention.
Figure 6:
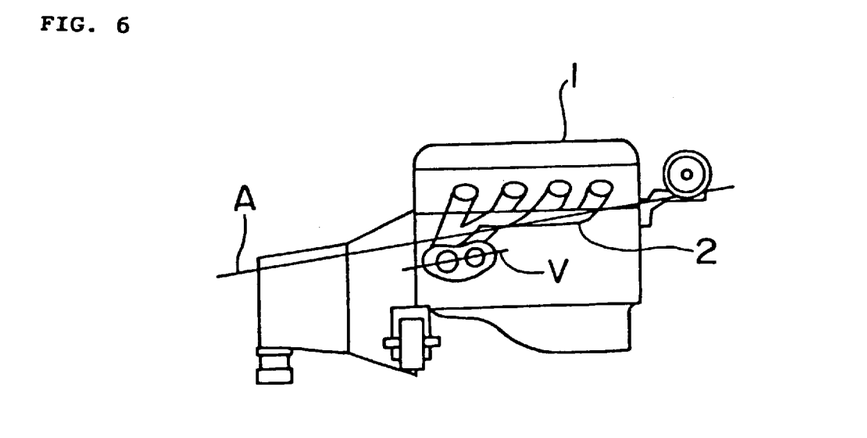
FIG. 6 is a view showing a relationship between a roll axis of the engine and a rotary axis of the joint.
Figure 7:
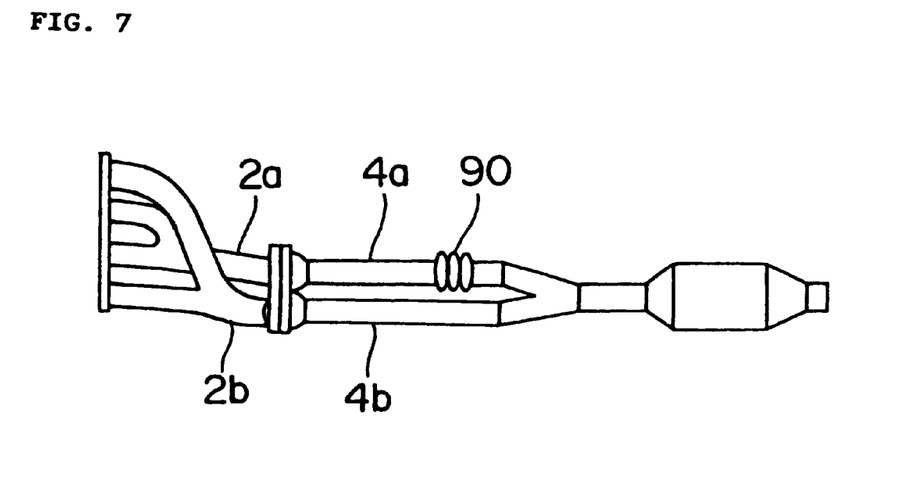
FIG. 7 is an overall view showing a modification of an exhaust system according to the present invention.
Figure 8:
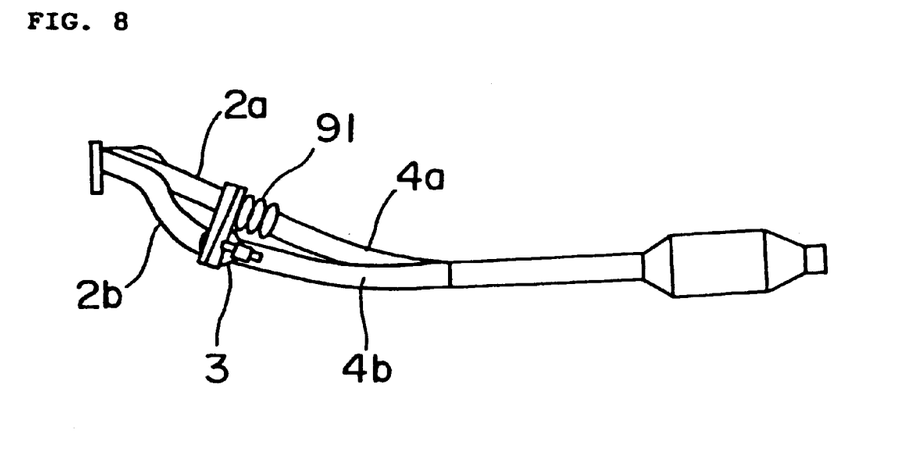
FIG. 8 is an overall view showing another example of an exhaust system according to the present invention.
Figure 9:
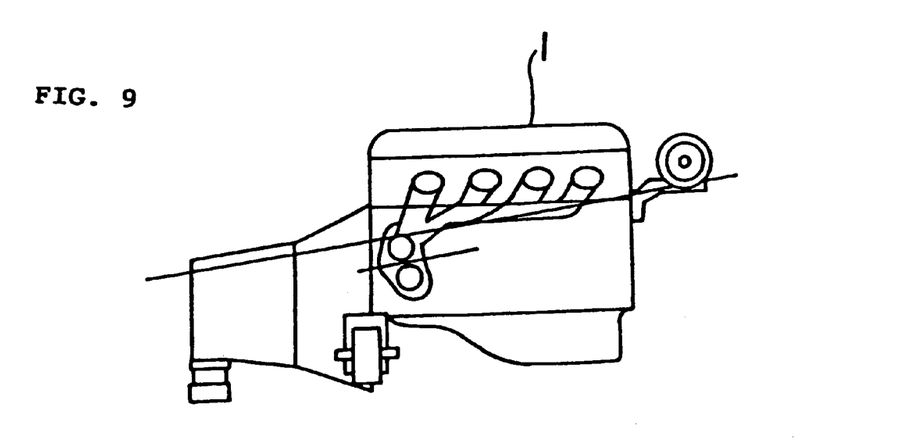

FIGS. 1 to 6 show one example of the invention, FIG. 7 shows a modification thereof, and FIGS. 8 and 9 show another example.

(Outline of Exhaust System)

FIG. 5 is a view showing an exhaust system of an internal combustion engine (hereinafter simply referred to as an engine).

First of all, a first exhaust pipe 2 is connected to an exhaust port of an engine 1. A second exhaust pipe 4 is connected to the first exhaust pipe 2 through a joint 3 according to the present invention.

The engine 1 is a so-called FF horizontal reciprocating engine. In this case, the number of the cylinders is four but the number is not limited to that.

The engine 1 is coupled with a trans-axle 5 and is mounted swingably in a chassis by an engine mount (not shown). In case of an FF vehicle, the engine 1 is supported at three or four points, and a roll axis (A) is determined by its mount position and spring constant. When a torque such as an acceleration of the vehicle or the like is applied to the engine 1, the engine 1 is fluctuated about the roll axis (A) in proportion to its torque reactive force. The roll load of the engine 1 is determined by an engine output, a gear ratio, and a differential ratio (i.e., torque reactive force). The roll angle means a balance point between the torque reactive force and a roll rigidity of the engine mount. Accordingly, the larger the toque is (large exhaust amount, large gear ratio) or the softer the engine mount is, the roll angle becomes large. In case of an FF vehicle, the roll angle becomes large corresponding to the differential ratio in comparison with an FR vehicle.

Next, the first exhaust pipe 2 is a dual exhaust manifold. As is apparent from FIG. 4, the first exhaust pipe 2 has, in a juxtaposed manner, a first manifold 2a having one side ends connected to exhaust ports of first and fourth cylinders of the engine 1 and other ends merged into a first exhaust port 12a, and a second manifold 2b having one side ends connected to exhaust ports of second and third cylinders of the engine 1 and other ends merged into a second exhaust port 12b.

Figure 4:
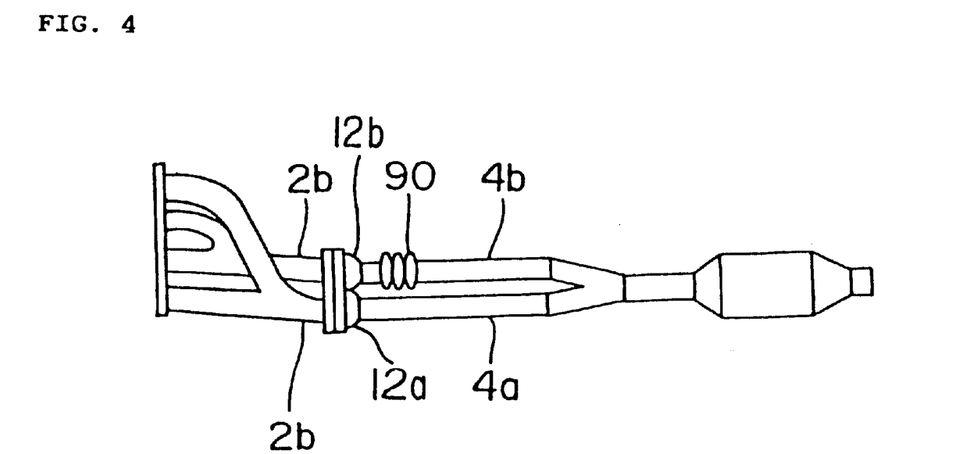
FIG. 4 is an overall view showing one example of an exhaust system according to the present invention.

The second exhaust pipe 4 has two Fr pipes 4a and 4b connected to the first exhaust port 12a of the first manifold 2a and the second exhaust port 12b of the second manifold 2b through the joint 3, respectively, a center pipe 7 connected to the Fr pipes 4a and 4b through a joint 6, and a tail pipe 9 connected to the center pipe 7 through a joint 8.

A catalyst converter 15 is interposed in the vicinity of terminal ends of the Fr pipes 4a and 4b. A sub-muffler 16 is interposed in the center pipe 7. A main muffler 17 is interposed in the tail pipe 9.

The exhaust system is suspended from the chassis by a support 20a of the sub-muffler 16 and by supports 20b and 20c of the main muffler 17. Incidentally, reference numeral 21 designate a gravitational center of the exhaust pipe. The gravity center serves as a inertia center of the exhaust pipe for a rotary axis of the exhaust pipe. Then, the load to be applied to the exhaust pipe due to the engine roll shift is determined by the reactive force of the exhaust system. The reactive force of the exhaust system is determined mainly by the spring constants of the supports 20a, 20b and 20c, the support positions, the exhaust system weight and the position of the gravity center.

(Joint Structure)

The above-described joint has a structure that may be bent in the roll direction of the engine about the center as the roll shaft, i.e., in the fluctuation direction. The bend axis is substantially in parallel with the roll axis (A).

Figure 3:
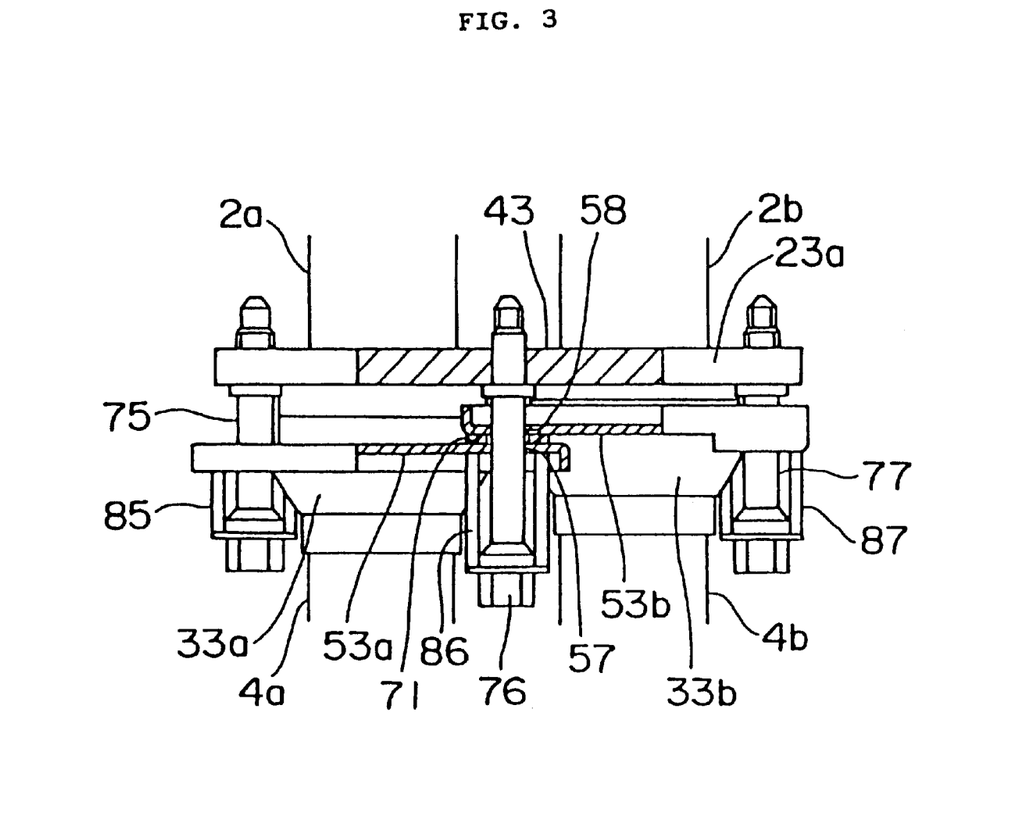
FIG. 3 is a fragmentary cross-sectional view showing a fastened condition by bolts.

The joint structure will now be described in greater detail with reference to FIGS. 1 and 3.

Figure 1:
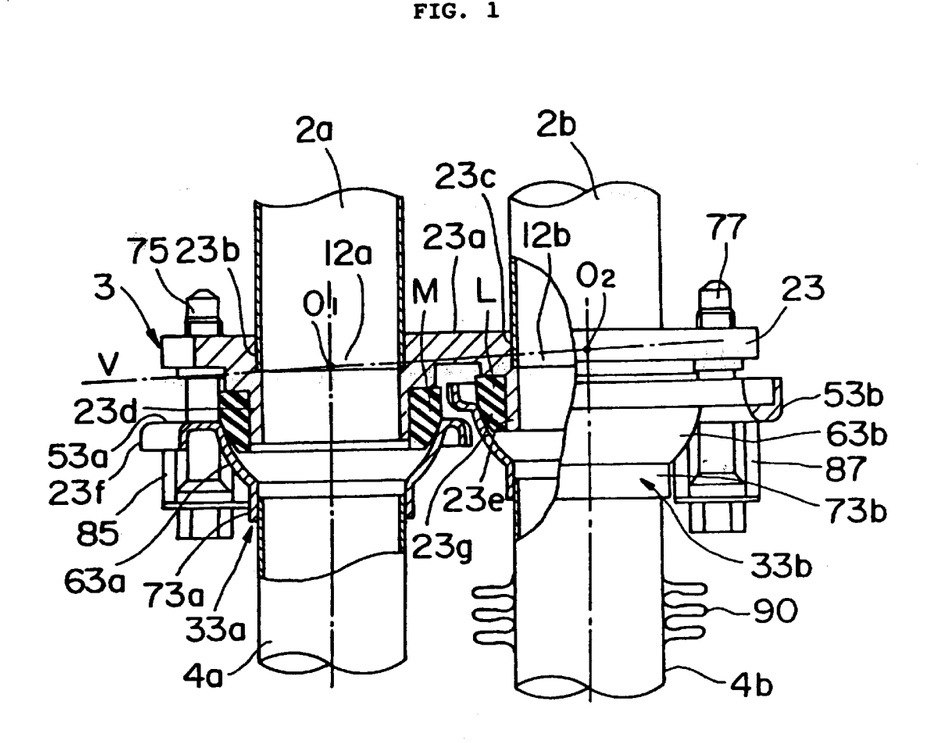
FIG. 1 is a fragmentary cross-sectional view showing one example of a joint structure for exhaust pipes according to the present invention.
Figure 2:
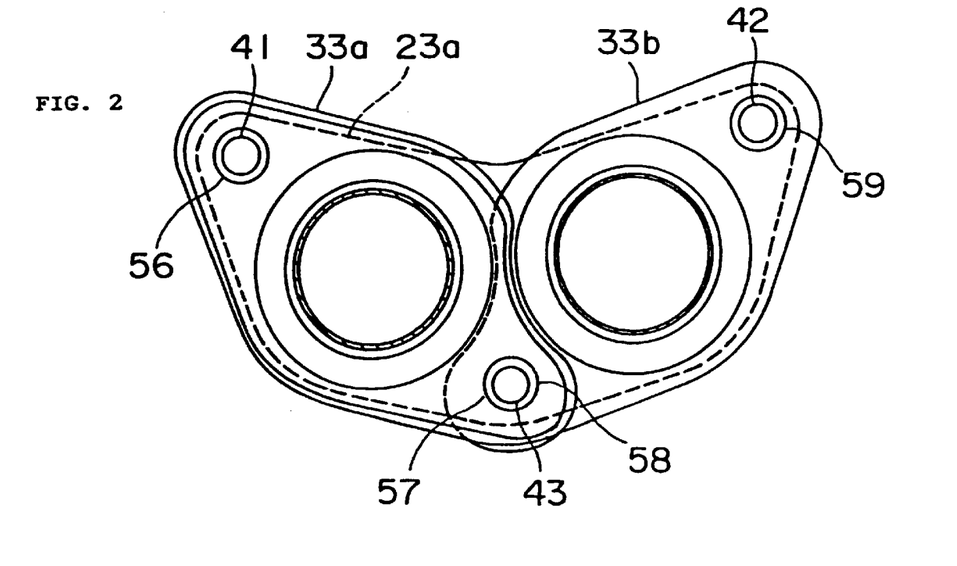
FIG. 2 is a frontal view showing a relationship between a stationary flange and spherical flanges.

In FIG. 1, the two upper pipes are the above-described first manifold 2a and the above-described second manifold 2b. The two lower pipes are the above-described two Fr pipes 4a and 4b. The respective manifolds 2a and 2b and Fr pipes 4a and 4b are paired, respectively, to form two joint pairs connected with each other at the joint 3.

The joint 3 has a stationary flange 23 mounted on the manifold side and spherical flanges 33a and 33b mounted on the Fr pipe side for each joint pair. The spherical flanges 33a and 33b are facing the manifolds 2a and 2b.

The stationary flange 23 has two joint ports 23b and 23c for inserting and connecting the first exhaust port 12a of the first manifold 2a and the second exhaust port 12b of the second manifold 2b to an integral flange portion 23a for integrally fixing the first manifold 2a and the second manifold 2b to each other.

Joint pipe portions 23d and 23e which extend from the peripheral portions of the two joint ports 23b and 23c toward the Fr pipes 4a and 4b are provided integrally with the flange portion 23a. Inside and outside diameters of the joint pipe portions 23d and 23e are substantially the same as those of the Fr pipes 4a and 4b.

Furthermore, the Fr pipe side end face of one joint pipe portion 23d and the Fr pipe side end face of the other joint pipe portion 23e are stepped in the axial direction of the joint pipe portion, i.e., the axial direction of the exhaust pipe. In FIG. 1, a height of the left joint pipe portion 23d is greater than that of the right joint pipe portion 23e. Annular gaskets 23f and 23g are provided around the outer periphery portions of the joint pipe portions 23d and 23e, respectively, for sealing the exhaust gas with spherical flanges 33a and 33b. Corner portions of the gaskets 23f and 23g on the spherical flange side are chamfered in a spherical shape.

Also, the stationary flange 23a has screw holes 41, 42 and 43 for bolt engagement at both ends and a central portion thereof in an arranged direction of the Fr pipes 4a and 4b, i.e., in the right and left direction in the drawing 1. When the center of the respective screw holes 41, 42 and 43 are connected to each other, an isosceles triangle having a bottom side between the screw holes 41 and 42 of both end portions of the stationary flange.

The respective spherical flange 33a and 33b have rhombic planar portions 53a and 53b, and spherical portions 63a and 63b, around the joint ports, disposed in the center of the planar portions 53a and 53b. The joint ports are formed by joint sleeves 73a and 73b. The above-described Fr pipes 4a and 4b are hermetically inserted into the joint sleeves 73a and 73b and welded. The inner surfaces of spherical portions 63a and 63b are directed to the manifolds 2a and 2b.

In FIG. 1, one spherical flange 33a mounted in the left side joint pair is different in detailed structure from the other spherical flange 33b mounted on the right side joint pair. Of the spherical flange 33a, the peripheral edge of the planar portion 53a is bent toward the Fr pipe 4a, whereas of the other spherical flange 33b, the peripheral edge of the planar portion 53b is bent on the manifold 2b.

Bolt insertion holes 56, 57, 58 and 59 are provided at both end portions in the longitudinal direction of each rhombus in the planar portions 53a and 53b.

One spherical flange 33a is arranged so that under the condition that the spherical portion 63a confronts with one joint pipe portion 23d of the stationary flange 23a, one bolt insertion hole 56 is in alignment with one screw hole 41 of the stationary flange 23a, and the other bolt insertion hole 57 is in alignment with the central screw hole 43 of the stationary flange 23a.

Also, the other spherical flange 33b is arranged so that under the condition that the spherical portion 63b confronts with the other joint pipe portion 23e of the stationary flange 23a, one bolt insertion hole 58 is in alignment with one screw hole 43 of the stationary flange 23a, and the other bolt insertion hole 59 is in alignment with the central screw hole 42 of the stationary flange 23a.

Accordingly, one spherical flange 33a and the other spherical flange 33b are arranged in a stepped manner in the axial direction of the exhaust pipe, and the planar portions 53a and 53b of the respective flanges are overlapped at the portion of the central screw hole 43 of the stationary flange 23a. In the overlapped portion, as best shown in FIG. 3, an attenuater (dampening member) 71 made of SUS mesh or the like is interposed between the planar portions 53a and 53b. This is used for attenuating interference noises caused by the flanges.

Furthermore, a first bolt 75 is inserted into one bolt insertion hole 56 in one spherical flange 33a and is threadedly engaged with one screw hole 41 of the stationary flange 23a. In the same manner, a second bolt 76 is inserted into the other bolt hole 57 of one spherical flange 33a and one bolt insertion hole 58 of the other spherical flange 33b and is threadedly engaged with the central screw hole 43 of the stationary flange 23a. Furthermore, a third bolt 77 is inserted into the other bolt insertion hole 59 of the other spherical flange 33b and is threadedly engaged with the other screw hole 42 of the stationary flange 23a.

First, second and third coil springs 85, 86 and 87 are interposed between heads of the first, second and third bolts 75, 76 and 77 and the planar portions of the spherical flanges, respectively, so that the spherical flanges 33a and 33b are pushed on the manifold side by the biasing forces of the coil springs 85, 86 and 87. The inner surfaces of the spherical portions 63a and 63b are pushed against the spherically chamfered portions of the gaskets 23f and 23g provided around the joint pipe portions 23d and 23e of the stationary flanges to hermetically seal the exhaust pipe joint portions by these two components.

The posture of each spherical flange relative to the stationary flange 23a is determined by the biasing force of each coil spring 85, 86, 87. In this case, a force which is twice greater than that of the first and third bolts 75 and 77 at both ends is applied to the second bolt 76 that fastens the overlapped portion of the planar portions 53a and 53b. Accordingly, the spring constant of the second coil spring 86 arranged at the second bolt 76 is made twice greater than the spring constants of the first and third coil springs 85 and 87 arranged at the first and third bolts 75 and 77 so that the posture of each spherical flange 33a, 33b is kept constant relative to the stationary flange 23a.

Under such a mount condition of the joint 3, a line V connecting a spherical surface center 01 of the spherical portion 63a of one spherical flange and a spherical surface center 02 of the spherical portion 63b of the other spherical flange is arranged substantially in parallel with the roll axis (A) of the engine 1. The relationship therebetween is shown in FIG. 6. As viewed from the different aspect, an axis connecting the spherical surface center point of the spherical portions 63a or 63b and the center of the joint port provided in the center between the spherical surface portions 63a and 63b is substantially perpendicular to the roll axis (A).

(Operation)

With such an arrangement, upon the start and acceleration of the vehicle, the roll load is generated by the torque reactive force of the engine to be applied to the exhaust pipes 2 and 4. Due to the fact that the line (V) connecting the spherical surface centers of the respective spherical flanges of the respective joint pairs is substantially in parallel with the engine roll axis A, when the engine roll is generated by the torque reactive force, a roll shift is inputted in a direction along the surfaces of the spherical flanges about the rotary center as the line connecting the spherical centers of the respective spherical flanges 3. As a result, the first exhaust pipe 2 and the second exhaust pipe 4 are rotated relative to each other like a hinge while using the spherical surfaces as the sliding surfaces. Accordingly, the roll load is absorbed and there is no fear that the joint portion would be damaged, the joint portion would be lifted or the exhaust gas would leak.

A mechanical strength of a sole joint having the spherical surface flanges 33a and 33b is considerably enhanced by using slide bearings like the spherical surface portions 63a and 63b. In contrast thereto, in the case where the sole flexible joint which is simply made of bellows is provided, it is desirable to use a soft spring characteristic in order to reduce the vibrations in the bellows pipe, the spring power of which depends upon the bellows pipe characteristic. However, the softer the spring characteristics is made, the thinner the thickness of the plate becomes. As a result, the mechanical strength is degraded as the sole joint. Accordingly, in case of the bellows pipe, it is necessary to provide stops for fastening the vicinity of the bellows.

Also, the bellows pipe allows not only the rotational motion but also the parallel motion in the joint portion. In view of the durability of the bellows pipe due to the parallel motion, it is necessary to suspend the exhaust pipe in the vicinity of the bellows pipe to the chassis by supports. Accordingly, the vibrations are transmitted to the chassis from the supports for suspending the exhaust pipe. The vibrations swing the chassis and cause the noises in the passenger room.

In this point, in the above-described joint structure, since it only has rotational direction springs (engine roll direction), the rigidity is high in the parallel motion, and stops that are needed in the bellows are not necessary. Also, the number of the support points is several after the exhaust pipe 4 so that the maintenance posture of the exhaust pipe 4 may be kept. This will not adversely affect the rigidity of the joint per se. Furthermore, it is possible to support the whole structure only at the positions of the relatively heavy components of the muffler or the like. It is unnecessary to support the whole structure at the positions where the relatively light weight components like an exhaust pipe as in the case where the bellows pipe is used. The support positions are only where the vibratory acceleration of the exhaust system is low. The vibration level that is transmitted from the support points to the chassis may be reduced.

In the specification, there is a description that, in the above-described Japanese Patent Application No. Hei 6-108832 which discloses the prior art, when the outside exhaust pipe and the inside exhaust pipes are different in shift amount from each other, the leak is generated between the inside exhaust pipes so that a so-called dual effect is obviated by the exhaust interference. Also, this prior art suffers from the problem that the gaskets of the inside joint portion are always exposed in the exhaust gas heat and the gap is likely to be generated due to the corrosion due to the exhaust gas heat. Furthermore, since the exhaust pipes are internally incorporated, the flow resistance of the exhaust gas flow in the outside exhaust pipe is increased so that the back pressure is increased.

In contrast thereto, with the structure according to the present invention, there is no fear that the dual effect would be obviated by the exhaust interference due to the leakage.

Also, according to the present invention, it is possible to make the joint portion small in size and the exhaust pipe is not expanded outwardly. Thus, the joint structure may be made small in size.

The miniaturization of the structure may contribute to the reduction in vibratory amplitude at the joint portion. Namely, although the longer a distance between the joint portion and the roll axis of the engine is, the larger the vibratory amplitude of roll at the joint portion becomes, if the joint per se becomes small in size, even if a length of the manifold is kept constant, the line connecting the centers of the joint, i.e., the spherical surface centers of the respective spherical flanges may approach the engine roll axis to such an extent that the joint is small in size. Accordingly, the vibratory amplitude is decreased in proportion to the decreased distance.

Furthermore, the fact that the planar portions 53a and 53b of the spherical flanges 33a and 33b are overlapped partially with each other may contribute to the miniaturization. In this case, since the damper 71 is interposed between the planar portions 53a and 53b, the two planar portions 53a and 53b will not interfere with each other. Thus, the noises or the like would not be generated.

Incidentally, although the stationary flange 23a is provided on the side of the manifolds 2a and 2b, and the spherical flanges 33a and 33b are provided on the side of the Fr pipes 4a and 4b, it is possible to take the reverse arrangement. Namely, the stationary flange 23a may be provided on the side of the Fr pipes 4a and 4b and the spherical flanges 33a and 33b may be provided on the side of the manifolds 2a and 2b.

(Additional Structure)

A bellows pipe 90 is interposed as a flexible pipe member in one of the above-described two Fr pipes (the right side in FIG. 1). If such a bellows pipe 90 is added to the system, the exhaust pipe 4 may be moved not only at the joint portion but also the bellows pipe 90 portion.

Thus, the flexible pipe member 90 is arranged at the position which is downstream of the joint in the exhaust gas flow so that the vibratory shift except for the one about the roll axis may be absorbed.

As shown in FIGS. 4 and 7, the position of the bellows pipe may be determined suitably upstream or downstream of the Fr pipes by the spring constant in the rotational direction of the joint and the spring constant in the arrangement direction (tensile direction) of the bellows.

(Another Structure)

FIG. 8 shows an example in which the one paired joint is the same joint 3 as that of the foregoing example with the spherical flange facing either one of the first and second exhaust pipes 2 and 4 and the other paired joint is the flexible joint 91 made of a tubular member such as the bellows pipe having the flexibility.

With such an arrangement, the number of the joints having the spherical flanges is one and the other flexible joint may be movable in a universal direction. Accordingly, the flange having the spherical flange may also be moved in the universal direction. As a result, as shown in FIG. 9, even if the arrangement direction of the two exhaust ports of the manifolds is perpendicular to the roll axis, the exhaust pipe may rotate in the vertical direction thereto about the rotary center of the joint portion of the spherical flange. Accordingly, it is possible to absorb the roll load of the engine.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A joint structure for exhaust pipes, comprising;

a plurality of first exhaust pipes juxtaposed and connected to an internal combustion engine that may fluctuate about a roll axis, a plurality of second exhaust pipes juxtaposed to each other, and a joint connecting the first exhaust pipes and the second exhaust pipes, wherein, the respective first exhaust pipes form joint pairs connected with the respective second exhaust pipes, the joint is provided to the respective joint pairs of the exhaust first and second pipes respectively, a spherical flange facing the first or second exhaust pipes of the joint pairs is provided on the joint of the two or more joint pairs; and a line connecting spherical surface centers of the respective spherical flanges of the joints is substantially in parallel with the roll axis of the internal combustion engine.

2. The joint structure according to claim 1, wherein the spherical flanges are provided on the adjacent joint pairs;

the spherical flange of one joint pair is stepped in an axial direction of the exhaust pipes relative to the spherical flange of the other adjacent joint pair; and the flange of one joint pair and the flange of the other joint pair are partially overlapped with each other.

3. The joint structure according to claim 1, wherein a flexible tubular member is disposed at a position downstream of the joint in the exhaust gas flow.

4. A joint structure for exhaust pipes, comprising;

a plurality of first exhaust pipes juxtaposed and connected to an internal combustion engine, a plurality of second exhaust pipes juxtaposed to each other, and a joint connecting the first exhaust pipes and the second exhaust pipes, wherein, the respective first exhaust pipes form joint pairs connected with the respective second exhaust pipes, the joint is provided to the respective joint pairs of the exhaust first and second pipes respectively, one of the joints provided to one of the joint pairs has a spherical flange facing the first or second exhaust pipe of one of the joint pairs;

the other joints of the other joint pairs has a flexible tubular member.

* * * * *

UNITED STATES PATENT AND TRADEMARK OFFICE
CERTIFICATE OF CORRECTION

PATENT NO. : 5,966,932  Page 1 of 1
DATED : October 19, 1999
INVENTOR(S) : Hideo Yahagi It is certified that error appears in the above-identified patent and that said Letters Patent is hereby corrected as shown below:

Column 4,
Line 43-47, delete entire lines and insert the following:
--FIG. 9 is a view showing a relationship between a roll axis of the engine and a rotary axis of the joint for the structure shown in FIG. 8.
FIG. 10 is a showing of a prior art joint structure.--

Signed and Sealed this

Twenty-sixth Day of June, 2001

*Attest:*

*Attesting Officer*

NICHOLAS P. GODICI
*Acting Director of the United States Patent and Trademark Office*